United States Patent [19]
Koppen et al.

[11] 3,725,839
[45] Apr. 3, 1973

[54] MEASURING RESISTANCE DEVICE FOR HIGH VOLTAGE

[75] Inventors: Gerhard Koppen; Wilfried Dobring; Manfred Siebart, all of Berlin, Germany

[73] Assignee: Siemens Aktiengesellschaft, Berlin and Munich, Germany

[22] Filed: July 14, 1971

[21] Appl. No.: 162,440

[30] Foreign Application Priority Data

July 24, 1970 Germany................P 20 37 907.1

[52] U.S. Cl. ...............338/334, 338/260, 338/295, 338/319, 338/320
[51] Int. Cl. .............................................H01c 1/16
[58] Field of Search......338/260, 320, 295, 235, 239, 338/315, 319, 334

[56] References Cited
UNITED STATES PATENTS

| | | |
|---|---|---|
| 2,642,513 | 6/1953 | Smith...................................338/260 |
| 2,962,685 | 11/1960 | Langford.............................338/260 |
| 3,546,653 | 12/1970 | Jawelak..........................338/219 X |

*Primary Examiner*—E. A. Goldberg
*Attorney*—Curt M. Avery et al.

[57] ABSTRACT

A measuring resistance device for high voltage such as for measuring the accelerating voltage of particle-beam apparatus, especially an electron microscope, has a housing fillable with a fluid insulating medium and a carrier disposed in the housing. The carrier has a plurality of disk-like carrier plates made of electrical insulating material and spacers for mutually separating the plates. The spacers and the plates are stacked to conjointly configure the carrier as columnar structure. A plurality of individual rod-like resistors are serially connected together and grouped into a plurality of sets, each of the sets being arranged on a corresponding one of the plates.

11 Claims, 3 Drawing Figures

MEASURING RESISTANCE DEVICE FOR HIGH VOLTAGE

Our invention relates to a measuring resistance device for high voltage, especially for measuring the acceleration voltage in particle-beam apparatus such as electron microscopes. The measuring resistance device includes a plurality of rod-like individual resistors serially connected together which are arranged on a carrier structure in a housing filled with a gaseous or liquid insulating medium.

In a known configuration of the foregoing type, the individual resistors are secured in a row one behind the other on a step-like carrier structure such that the individual resistors are arranged in a long extended line lying transverse one over the other. The carrier structure is secured to a cover closing the housing and projects into the interior of the housing filled with insulating medium. This housing is at zero potential because of safety considerations. The cable conducting high voltage ends in a guide structure or feed-through member which likewise projects into the interior of the housing. The serial connection consisting of the individual resistors lies between a connection terminal conducting high voltage and a connection terminal conducting zero potential.

As a consequence of the longitudinally extending construction of the carrier structure for the individual resistances, a large construction height for the housing is needed. The remaining housing dimensions are determined through the spacing required for preventing arcing between the housing and the high voltage conducting parts of the connection terminals and the serial connection of the individual resistors.

Accordingly, it is an object of our invention to provide a measuring resistance device for high voltage configured in a space saving arrangement whereby the housing surrounding the individual resistances can be constructed with substantially smaller dimensioning than heretofore.

According to a feature of the invention, the carrier structure is constructed with disc-like, electrically isolating carrier plates which hold the individual resistances spatially next to each other on at least one side. The carrier plates are assembled one beneath the other with spacing to from a columnar structure. The assembly of a plurality of carrier plates to form a column has the advantage of requiring only a limited space and achieves the objective of reducing the dimensions of the housing especially with respect to height. The disc-like carrier plates are configured most advantageously to be circular annular rings. The ring-shaped flat region of the plates is advantageously dimensioned to the length of the individual rod-like resistors. Preferably, as disc-like carrier plates, printed circuit plates are used wherewith the electrical connection of individual resistors is expeditiously performed. The carrier plates hold the rod-like individual resistors with special advantage in a radial arrangement. In this way, the available space is put to use in an especially advantageous manner.

An especially good usage of the required area is obtained if the individual resistors are arranged in two planes on both sides of the carrier plate. For electrical reasons, it is advantageous if the individual resistors in both planes of a carrier plate are respectively alternately connected in series, that is, the resistors on a carrier plate are serially connected together such that every other resistor lies in the same plane.

The connecting ends of the individual resistors are bent to facilitate their insertion into the disc-like carrier plates. However, since these bends cause or facilitate the occurrence of corona discharge, it is advantageous to arrange metallic caps at the periphery of the carrier plate which cover the ends of the resistors directed toward the periphery.

Since the carrier plates within the column must have a spacing determined by the highest potential between the plates, supporting insulators are installed to serve as spacing holders.

In one embodiment of the invention, the supporting insulators are constructed from cylindrical profiles of insulating material which receive the carrier plates in surface recesses. In this way, the supporting insulators can grip with their recesses onto corresponding projections of a neighboring supporting insulator. If the cylindrical profiles are configured to be hollow and these, with the carrier plates included therebetween, are tensioned against each other, there is obtained advantageously the possibility that a lead-through member or lead-in member can be arranged so as to project into the housing interior for providing a high-voltage connection. The lead-through member can be arranged so as to project into the cylindrical supporting insulators such that the latter surround the former. A special advantage with respect to the available space is obtained if the total length of the supporting insulators exceeds the total length of the lead-through member by only a small amount.

In a preferred embodiment of the invention, the hollow supporting isolators carry a metal screen or shield at their free end close to the lead-through member. The shield is at an intermediate potential and is adapted to the form of the carrier plates.

The invention will now be described with reference to the drawings, wherein.

Figure 1:
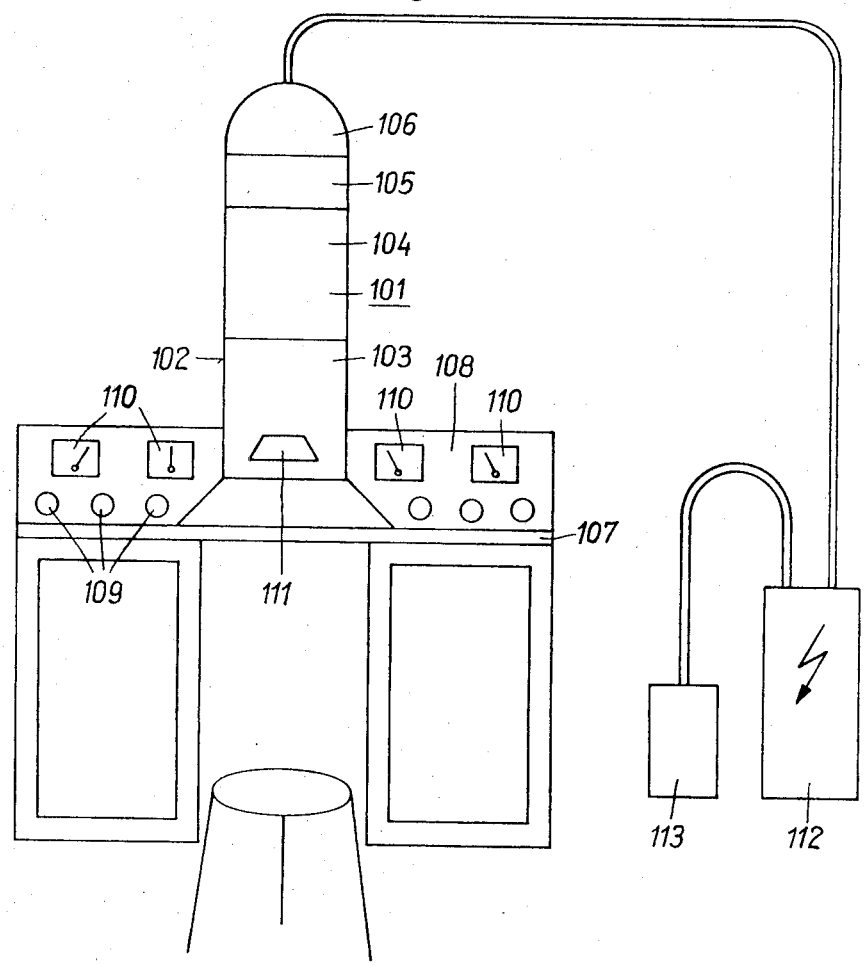
FIG. 1 illustrates an electron microscope equipped with appropriate high-voltage components.

The electron microscope 101 comprises a column 102 which is assembled of a plurality of components 103, 104, 105 and 106. Component 106 contains the system for generating the electron beam and the remaining components 103, 104 and 105 possess means for influencing the electron beam, especially as to deflection, and for inserting specimen holders. The column 102 is supported atop a work table 107 which has a raised portion 108 for accommodating the control knobs 109 for adjusting various beam deflections and the like. Also mounted on portion 108 are measuring instruments 110 for monitoring the positioning and adjusting indications. Component 103 is equipped with a window 111 through which images of a specimen placed in the interior of the column 102 and appearing on a viewing screen can be received.

The system for generating the electron beam arranged in component 106 requires a high direct-current voltage of a magnitude of 60 kV to approximately 1 MV as required; this poses high requirements on the immunity from interference and stability of the high voltage. This high voltage is generated by a generator 112 and stabilized in a network. The network includes reference voltage sources as well as measuring resistance device 113 for the high voltage. From the measuring resistance device 113, a voltage value proportional to the actual value high voltage can be taken and be applied for regulation purposes. The measuring resistance device 113 is explained in greater detail in FIGS. 2 and 3.

Figure 2:
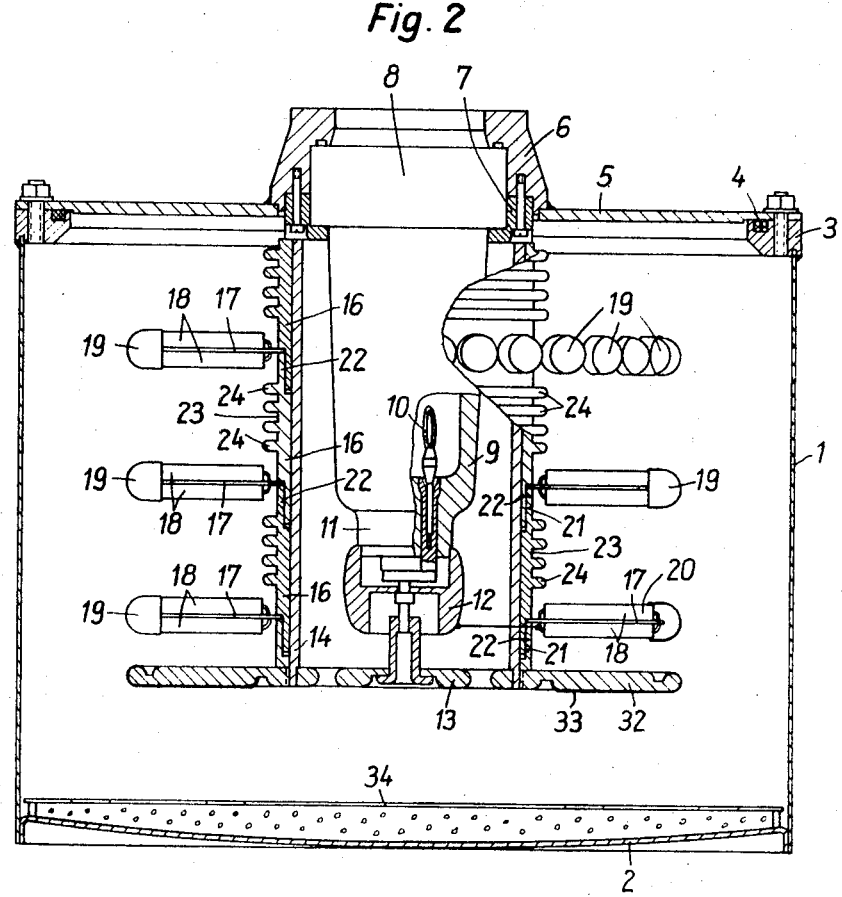
FIG. 2 illustrates, partially in section, an embodiment of a measuring resistance device for high voltage situated in a housing and equipped with a number of carrier plates for accommodating individual resistors.

The measuring resistance device of FIG. 2 for high voltage is especially useful for measuring the acceleration voltage of the electron microscopes. The measuring resistance device comprises a housing 1, for example, of iron sheet metal. The housing is configured as a cylinder which has at its base a sealing plate 2 which is joined gas-tight to the cylinder. At its top side, the housing 1 carries a cover part 5 on flanges 3 with sealing members 4. The cover part 5 has a ring member 6 centrally disposed for accommodating a high-voltage cable, the latter not being shown in the drawing.

The ring member 6 holds a lead-through member 8 made of electrically insulating material such as Araldit with an associated flange ring 7. The lead-through member 8 is constructed to be hollow for accommodating the high-voltage cable and carries at its closed end face 9 pin contact 10 for electrically joining to the high-voltage cable. The lead-through member 8 is provided at its free end 11 with a metal body 12 forming the high-voltage terminal. The terminal 12 is in conductive connection with the pin contact 10. Instead of a lead-through member 8, the high-voltage cable can be led directly into the housing 1, preferably in tight connection with a cover part 5.

In addition, a plate 13 is connected with the lead-through member 8 and tensions a hollow insulator 14 against the cover portion part 5. The hollow-formed insulator 14 surrounds the lead-through member 8 and the high-voltage connection terminal 12. Supporting insulators fabricated from cylindrical profiles made of insulating material are stacked on the hollow-formed insulator 14 together with intermediately placed disk-like carrier plates.

The disk-like carrier plates 17 are configured to be circular annular members and are fabricated akin to printed circuit conductor plates, for example, those fabricated from copper-lined Pertinax. These disk-like carrier plates 17 hold radially arranged rod-like individual resistors 18 having a value from approximately 1 to 10 megaohms.

In the illustrated embodiment, the individual resistors 18 are arranged in two planes on two sides of the carrier plate 17. At the periphery of the carrier plate 17 metal caps 19 are arranged which cover the ends 20 of the individual resistors 18 directed toward the outer periphery. The metallic caps 19 serve to weaken the field strength, that is, they are placed as corona caps.

The carrier plates 17 are concentrically held by supporting insulators 16 configured as spacer holders. The plates 17 are held on their inner radial peripheries in surface recesses 21. The supporting insulators 16 grip with their surface recesses 21 onto corresponding projections 22 of a neighboring supporting insulator. The outside jacket surface 23 of the supporting insulators 16 is provided with ribs 24 for extending the creep-current path.

Figure 3:
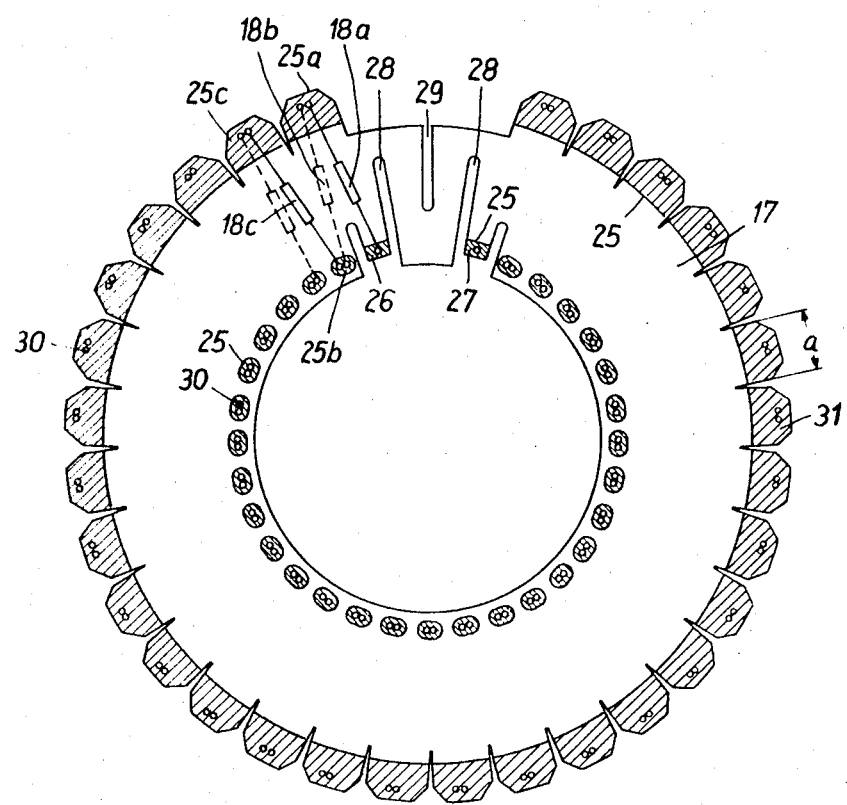
FIG. 3 illustrates one of the carrier plates of the device of FIG. 2 in plan view and shows details of resistor arrangement.

The embodiment illustrated in FIG. 3 of a disk-like carrier plate made of insulating material has one side provided with surface regions 25 that are electrically conducting. The two electrical connecting terminals 26, 27 are situated spacially close to each other, although separated by cuts 28, 29 forming extended electrical current paths.

A resistor 18a extends from the connecting terminal 26 to the electrically conducting layer 25a. From there, a further resistor 18b connects to conducting path 25b. And from the latter, a resistor 18c extends to conducting path 25c. The resistors 18a, 18c are located on the top side of the carrier plate, whereas the resistor 18b and the remaining like resistors are at the bottom side of the carrier plate 17. The leads of the resistors 18 pass through holes 30 and are electrically joined by means of soldering. As is apparent in this embodiment of the carrier plate, there is obtained a serial electric connection of all individual resistors.

The outer radial periphery of the carrier plate 17 is serrated. Each tooth has a width a and is adapted to the inner diameter of the cap 19. It is especially advantageous if the caps 19 are tension placed upon the teeth 31 so as to be self-holding. A voltage of 35 kV can be applied to the connection terminals 26, 27.

In the embodiment according to FIG. 2, three carrier plates are provided and correspond to a measuring resistance device suitable for more than 135 kV.

The high voltage directed to the pin contact 10 is conducted via terminal 12 to the connecting terminal 26. The connecting terminal 27 of the lowest carrier plate 17 is electrically connected with the connecting terminal 26 of the intermediate carrier plate. Correspondingly, connecting terminal 27 of the intermediate carrier plate is electrically connected with the connecting terminal 26 of the upper carrier plate 17. The connecting terminal 27 of the upper carrier plate 17 is at zero potential. In this way, there is obtained an embodiment of the invention wherein the high voltage breaks down along the supporting insulators 16 and along the hollow cylinder 14 toward the cover member 5 of the housing. Outgoing from the terminal 12, the high voltage breaks down in the same manner on the lead-through member 8 carried on the cover member 5. By selecting approximately the same length relationships between the lead-through member and the supporting insulators which surround the latter, the breakdown of the high voltage runs in the same direction and in approximately the same magnitude. This affords the possibility to arrange the supporting insulators in a smaller spacial region about the lead-through member 8 so that the required space remains small.

The hollow cylindrical supporting insulators 14, 16 carry a shield 32, 33 at their free end near the lead-through member 8. The shield 32, 33 is at an intermediate potential and has a shape which is adapted to that of the carrier plate 17. The shield 32 is fabricated from synthetic material and is provided with a metal layer 33. The metal layer 33 is advantageously joined electrically with the connecting terminal 27 of the lower carrier plate 17. The shield 32 prevents the application of too high an electric field intensity to the layers of resistors 18.

Since the metal shield 32, 33 is not at the potential of the high voltage but instead is at an intermediate potential, the construction height of the housing can be reduced since the required spacing between the metal shield 32, 33 and the base plate 2 can be selected to be smaller.

A sieve 34 is arranged above the housing floor 2 and covers active alumina against combining with fluorine and water. It is advantageous to maintain the sulfur hexofluoride with which the housing is filled under pressure.

While the invention has been described by means of a specific example and in a specific embodiment, we do not with to be limited thereto, for obvious modifications will occur to those skilled in the art, without departing from the essential features of the invention and within the scope of the claims annexed hereto.

We claim:

1. In combination with a high voltage cable having at least one end thereof covered with insulation, a measuring resistance device for high voltage such as for measuring the accelerating voltage of particle-beam apparatus, comprising a housing fillable with a fluid insulating medium, a carrier disposed in said housing, said carrier comprising a plurality of disk-like carrier plates made of electrical insulating material, spacer means and said plates being stacked to conjointly configure said carrier as columnar structure, and a plurality of individual rod-like resistors serially connected together, said resistors being grouped into a plurality of sets, each of said sets being arranged on a corresponding one of said plates, said housing having means for receiving therein said one end of said insulation-covered high voltage cable so that said spacer means surrounds said one end of the cable.

2. A measuring resistance device for high voltage such as for measuring the acceleration voltage for particle-beam apparatus comprising a housing fillable with a fluid insulating medium, a carrier disposed in said housing, said carrier comprising a plurality of disk-like carrier plates made of electrical insulating material, each of said plates being a printed-circuit plate, spacer means for mutually separating said plates said spacer means and said plates being stacked to conjointly configure said carrier as columnar structure, and a plurality of individual rod-like resistors serially connected together, said resistors being grouped into a plurality of sets, each of said sets being arranged on a corresponding one of said plates.

3. A measuring resistance device for high voltage such as for measuring the accelerating voltage of particle-beam apparatus, comprising a housing fillable with a fluid insulating medium, a carrier disposed in said housing, said carrier comprising a plurality of disk-like carrier plates made of electrical insulating material, spacer means for mutually separating said plates, said spacer means and said plates being stacked to conjointly configure said carrier as columnar structure, and a plurality of individual rod-like resistors serially connected together, said resistors being grouped into a plurality of sets, each of said sets being arranged on a corresponding one of said plates, the resistors of each of said sets being arranged in two planes on mutually opposite surfaces of said corresponding plate.

4. A measuring resistance device according to claim 3, the resistors on each plate being serially connected together such that every other resistor lies in the same plane.

5. A measuring resistance device for high voltage such as for measuring the accelerating voltage of particle-beam apparatus comprising a housing fillable with a fluid insulating medium, a carrier disposed in said housing, said carrier comprising a plurality of disk-like carrier plates made of electrical insulating material, spacer means for mutually separating said plates, said spacer means and said plates being stacked to conjointly configure said carrier as columnar structure, a plurality of individual rod-like resistors serially connected together, said resistors being grouped into a plurality of sets, each of said sets being arranged on a corresponding one of said plates, and a plurality of metal caps gripping onto said resistors respectively at the ends thereof directed toward the wall of said housing.

6. A measuring resistance device for high voltage such as for measuring the accelerating voltage of particle-beam apparatus, comprising a housing fillable with a fluid insulating medium, a carrier disposed in said housing, said carrier comprising a plurality of disk-like carrier plates made of electrical insulating material, spacer means for mutually separating said plates, said spacer means and said plates being stacked to conjointly configure said carrier as columnar structure, and a plurality of individual rod-like resistors serially connected together, said resistors being grouped into a plurality of sets, each of said sets being arranged on a corresponding one of said plates, said spacer means comprising a plurality of supporting insulators alternating with said plates in said columnar structure, said insulators being made from a cylindrical profile of insulating material, said insulators defining a plurality of surface recesses for receiving and holding said plates respectively.

7. A measuring resistance device for high voltage such as for measuring the accelerating voltage of particle-beam apparatus, comprising a housing fillable with a fluid insulating medium, a carrier disposed in said housing, said carrier comprising a plurality of disk-like carrier plates made of electrical insulating material, spacer means for mutually separating said plates, said spacer means and said plates being stacked to conjointly configure said carrier as columnar structure, and a plurality of individual rod-like resistors serially connected together, said resistors being grouped into a plurality of sets, each of said sets being arranged on a corresponding one of said plates, said spacer means comprising a plurality of supporting insulators alternating with said plates in said columnar structure, each of said supporting insulators having a projection and surface recess, the surface recess of one insulator gripping onto the projection of the next neighboring insulator.

8. A measuring resistance device according to claim 6, wherein said cylindrical profile is hollow and said device comprises tensioning means for holding said insulators and said plates in said columnar structure.

9. A measuring resistance device for high voltage such as for measuring the accelerating voltage of particle-beam apparatus comprising a housing fillable with a fluid insulating medium, a carrier disposed in said housing, said carrier comprising a plurality of disk-like carrier plates made of electrical insulating material, spacer means for mutually separating said plates, said spacer means and said plates being stacked to conjointly configure said carrier as columnar structure, a plurality of individual rod-like resistors serially connected together, said resistors being grouped into a plurality of sets, each of said sets being arranged on a corresponding one of said plates, and a lead-through member for accommodating an insertable high-voltage cable, said lead-through member projecting into the interior of said housing, said spacer means being disposed in surrounding relation to said lead-through member.

10. A measuring resistance device according to claim 9, said spacer means surrounding one end of the cable when the latter is inserted into said lead-through member.

11. A measuring resistance device according to claim 9, comprising a metal shield carried by said columnar structure at the end thereof closest to the end of said lead-through member, said shield being dimensioned to correspond approximately to the shape of said carrier plates.

* * * * *